United States Patent [19]

Sansone et al.

[11] Patent Number: 4,817,002
[45] Date of Patent: Mar. 28, 1989

[54] ELECTRONIC POSTAGE METER NON-VOLATILE MEMORY SYSTEMS HAVING HUMAN VISUALLY READABLE AND MACHINE STORED DATA

[75] Inventors: Ronald P. Sansone, Weston; John J. Stelben, Greenwich, both of Conn.

[73] Assignee: Pitney Bowes Inc., Stamford, Conn.

[21] Appl. No.: 816,182

[22] Filed: Jan. 6, 1986

Related U.S. Application Data

[63] Continuation-in-part of Ser. No. 685,681, Dec. 24, 1984.

[51] Int. Cl.⁴ .............................................. G06F 3/147
[52] U.S. Cl. ................................. 364/200; 364/464.02
[58] Field of Search ... 364/200 MS File, 900 MS File, 364/464, 466; 365/108

[56] References Cited

U.S. PATENT DOCUMENTS

| | | | |
|---|---|---|---|
| 3,896,452 | 7/1975 | Brown | 346/74 |
| 3,978,457 | 8/1976 | Check, Jr. et al. | 364/200 |
| 3,992,874 | 11/1976 | Collins | 58/50 |
| 4,001,809 | 1/1977 | Fukui et al. | 340/366 |
| 4,041,481 | 8/1977 | Sato | 340/324 |
| 4,087,861 | 5/1978 | Futagawa | 364/709 |
| 4,099,247 | 7/1978 | Mikada et al. | 364/710 |
| 4,203,106 | 5/1980 | Dalisa et al. | 340/787 |
| 4,218,302 | 8/1980 | Dalisa et al. | 204/299 |
| 4,224,506 | 9/1980 | Coppola et al. | 235/92 |
| 4,301,507 | 11/1981 | Soderberg | 364/464 |
| 4,306,775 | 12/1981 | Delapierre et al. | 350/357 |
| 4,309,083 | 1/1982 | Duchene et al. | 350/357 |
| 4,323,987 | 4/1982 | Holtz et al. | 365/229 |
| 4,471,440 | 9/1984 | Check, Jr. | 364/466 |
| 4,498,156 | 2/1985 | Pizzarello | 365/215 |
| 4,509,128 | 4/1985 | Coppola et al. | 364/464 |
| 4,544,834 | 10/1985 | Newport et al. | 235/487 |
| 4,567,744 | 3/1985 | McFiggans et al. | 364/464 X |
| 4,649,517 | 3/1987 | Kitazima et al. | 365/108 |

FOREIGN PATENT DOCUMENTS 0019515  11/1980  European Pat. Off. .

Primary Examiner—Raulfe B. Zache
Assistant Examiner—Florin Munteanu
Attorney, Agent, or Firm—Peter Vrahotes; Melvin J. Scolnick; David E. Pitchenik

[57] ABSTRACT

A computing system having a non-volatile memory with locations with store data and are physically accessible such that the locations can be human visually readable to determine the data values stored therein. The non-volatile memory is operatively coupled to the computing system so that the computing means can write data into the non-volatile memory.

A postage meter employing this system is adapted to be energized by an external source of operating power and includes a postage printing mechanism for printing postage and a computing system coupled to said postage printing mechanism for accounting for postage printed by the printing mechanism. A non-volatile memory for storing data is operatively coupled to the computing system and includes locations for storing data, critical postage accounting and other data when the postage meter is not energized by the external source of operating power. The location are human visually readable to determine the data stored therein and may also be machine readable by the computing system.

6 Claims, 7 Drawing Sheets

ELECTRONIC POSTAGE METER NON-VOLATILE MEMORY SYSTEMS HAVING HUMAN VISUALLY READABLE AND MACHINE STORED DATA

This is a continuation-in-part of U.S. patent application of Ronald Sansone, Ser. No. 685,681, filed Dec. 24, 1984.

CROSS REFERENCES TO RELATED APPLICATIONS

Reference is made to concurrently filed U.S. patent application of Ronald Sansone for MACHINE READABLE NON-VOLATILE MEMORY DISPLAY CELL, Ser. No. 685,812.

FIELD OF THE INVENTION

The present invention relates to non-volatile memory systems, and more particularly, to a human visually readable and machine readable non-volatile memory system for an electronic postage meter, and also to a human visually readable non-volatile memory which is isolated from the postage meter accounting circuitry and is not machine readable.

BACKGROUND OF THE INVENTION

Postage meters are mass produced devices for printing a defined unit value for governmental or private carrier delivery of parcels and envelopes. The term postage meter also includes other like devices which provide unit value printing such as tax stamp meters. Postage meters include internal accounting devices which account for postage value representation which is stored within the meter. The accounting device accounts for both the recharging of the meter with additional postage value and the printing of postage by the meter printing mechanism. No external independent accounting system is available for accounting for the postage printed by the meter. Accordingly, postage meters must possess a high reliability to avoid the loss of user or governmental funds stored within the meter and dispensed by printing postage.

Electronic postage meters have been developed and are disclosed, for example, in U.S. Pat. No. 3,978,457 for MICROCOMPUTERIZED ELECTRONIC POSTAGE METER SYSTEM; in U.S. Pat. No. 4,301,507 for ELECTRONIC POSTAGE METER HAVING PLURAL COMPUTING SYSTEMS; and, in European Patent Application, publication No. 0 019 515, for ELECTRONIC POSTAGE METER HAVING IMPROVED SECURITY AND FAULT TOLERANCE FEATURES. Such meters have electronic accounting circuits which include electronic non-volatile memory capability for storing postage accounting information. The accounting circuits and associated postage printing mechanism are physically sealed within a tamper resistant enclosure. The non-volatile memories are provided for storing critical postage accounting information when external operating power is not applied to the meter.

Various types of accounting information may be stored in the meter non-volatile memory. This information includes, for example, the total amount of postage remaining in the meter for subsequent printing (descending register) and the total amount of postage printed by the meter (ascending register). Other types of accounting or operating data may also be stored. For example, service information in the form of error codes denoting various types of malfunctions or abnormal conditions encountered during operation of the meter may be stored in non-volatile memories. This facilitates the evaluation of the operating experience of each meter to assist in its repair, should that be necessary, and to accumulate data helpful in the design of electronic postage meters.

Non-volatile memories as well as the other electronic accounting circuitry within electronic postage meters are susceptible to disturbances which can either destroy information or cause erroneous information to be generated. The electronic circuits are susceptible to electromagnetic radiation and electrical transients which can interfere with the proper operation of the meter and accurate storage of information. These types of effects can result in a loss of funds to the users and, accordingly, it has been recognized that various types of protection must be provided to avoid such undesirable results as the data cannot be reconstructed in most instances from other externally available records.

One type of sequence of operation when a malfunction is detected can include locking the meter against continued operation. In such case, a meter shutter bar may be positioned to prevent further operation of the printing mechanism and an interposed moved into a position to lock the shutter bar in its blocking position. When this occurs, the meter becomes inoperable to print further postage. Additionally, under certain failure or malfunction conditions, the non-volatile memories may not be accessible by the keyboard actuation. An example of such a malfunction would include a failure of the microprocessor in the meter or necessary peripheral circuits such as, depending upon the design, system clocks and memory address decoders. Systems such as that disclosed in the above-noted European Patent Application have also been designed to intentionally limit access to non-volatile memory when certain failure conditions are detected.

When the meter malfunctions and is taken out of service, it is necessary to determine the remaining balance of postal funds stored within the meter non-volatile memory and available for printing (descending register) so that such amount can be refunded to the customer or user. Depending on the type of meter usage and the point in time when a malfunction occurs, many thousands of dollars of postage may be stored in the non-volatile memory descending register. However, before a refund can be made to the user or customer, it is necessary to read out the contents of the non-volatile memory. This is not possible in systems where access to the non-volatile memory stored data requires utilization of the meter microprocessor or peripheral memory circuits, should these be inoperative. In this case, the meter housing must be opened and the meter memory physically accessed before proper amount of funds to be refunded can be determined.

In the electronic postage meter system described in the above-noted European Patent Application, when the meter becomes inoperable due to a fault condition, the non-volatile memories are accessible by an external channel connected from outside of the sealing housing. Once the meter has been set to a faulted state, the non-volatile memory contents can be read out independently of the meter microprocessor and the microprocessor is prevented from accessing the non-volatile memory. Necessary power to read the non-volatile memory is supplied to the memories through the external channel to enable reading of the non-volatile memory contents through the external channel without supplying power to the microprocessor.

Another system for reading the contents of the non-volatile memory when an electronic postage meter is inoperative is disclosed in U.S. patent application Ser. No. 344,651 filed Feb. 1, 1982, for ELECTRONIC POSTAGE METER HAVING POWER MAGNETICALLY COUPLED TO THE METER FROM THE METER BASE, now U.S. Pat. No. 4,471,440. The system includes having a plurality of locations for storing the postage accounting data in predetermined locations of a non-volatile memory which are physically accessible when the memory is removed from the meter. The locations are chosen so that they can be scanned by a scanning device to determine the orientations of the bit patterns without energizing the non-volatile memory and without physically altering the non-volatile memory structure.

Still another system for accessing electronic postage meter non-volatile memories when the meter is inoperative is described in U.S. patent application Ser. No. 399,594 filed July 19, 1982, for ACCESSIBLE HOUSING FOR ELECTRONIC SYSTEM, now U.S. Pat. No. 4,507,744. In this application, an auxiliary communication channel is provided containing read access lines to the non-volatile memory. Access to this communication channel is provided through a sealed access door, which provides both evidence of tampering when opened and electromagnetic interference protection when sealed. The access door is designed for operation on a single occasion only. Access through the door precludes further normal meter operation by deactivating the meter in such a manner that reactivation is not possible without disassembling of the meter housing which will result in evidence of tampering. Thus, the customer has immediate access to the postage funds upon reading the memory contents while achieving protection of the data, prevention of unauthorized alteration of the postage funds balance and unauthorized use of the meter.

SUMMARY OF THE INVENTION

The present invention provides a non-volatile memory system where stored data is both human visually readable and machine readable. In the present system, without the need for battery backup, information can be stored during periods of power interruption which can be human visually readable and which same information, upon the restoration of power and curing periods of normal operation, can be machine readable. By being human visually read, the system of the present invention allows easy and rapid reading of the data stored in the non-volatile memory without the need for special equipment. By being machine readable, the very same data can be processed at high speed. The invention provides a coincidence between what is seen and what is machine read.

It has also been discovered that the memory system of the present invention has unique applicability to postage meter systems to allow access to a postage meter non-volatile memory contents without the requirement of an external communications channel or the necessity of opening the main meter housing to gain access to the memory. The system thus allows easy and rapid recovery of the memory contents so that a user can be refunded postage amounts stored within an inoperative meter without the need for any additional special equipment.

In accordance with the invention, a memory is provided within a postage meter secured housing and positioned to be available in human visually readable form. In accordance with a feature of the invention the memory contents can be both machine readable as well as human visually readable. The system enables the meter microprocessor to access the memory and to utilize the same data as is available by human visual inspection of the meter.

A system embodying the present invention includes a computing device for performing data computations. A non-volatile memory is operatively coupled to the computing device. The non-volatile memory includes locations for storing data. The locations are physically accessible such that the locations can be human visually readable to determine the data values stored therein. The non-volatile memory is operatively coupled to the computing device such that the computing device can write data into the non-volatile memory and can read stored data from the non-volatile memory.

The system employing the invention described above is particularly advantageously incorporated into a postage meter. A postage meter thus embodying the invention is adapted to be energized by an external source of operating power and includes a postage printing mechanism for printing postage and a computing device coupled to the postage printing mechanism for accounting for postage printed by the printing mechanism. A non-volatile memory for storing data is operatively coupled to the computing device. The non-volatile memory includes locations for storing data when the postage meter is not energized by the external source of operating power. The locations are human visually readable to determine the data stored therein.

It has also been discovered that systems can be provided with human visually readable non-volatile memories which are fully isolated from the meter accounting circuits. Systems in accordance with the invention allow for existing electronic postage meter designs to be expanded to provide human visually readable non-volatile memory without extensive redesign to protect the critical accounting data stored in the existing non-volatile memory systems. The system of the present invention provides an auxiliary human visually readable non-volatile memory which is isolated by a unidirectional signal channel from the meter electronic accounting circuitry. In this way a human visually readable memory is available to provide an indication of funds remaining in the meter available for printing postage and other data, should the meter become inoperative. It has also been discovered that while provising still a high degree of isolation between the human visually readable memory system and the meter accounting circuits, a system can be provided to assure that identical information is being entered into the meter non-volatile memory system and the auxiliary human visually readable memory system. The human visually readable displays can be the electrolyte display cell or a liquid crystal display. A system embodying the present invention includes a computing system for performing data computations. A non-volatile memory is operatively coupled to the computing system. The non-volatile memory includes locations for storing data. The locations are physically accessible such that the locations can be human visually readable to determine the data values stored therein. The non-volatile memory is operatively coupled to the computing system such that the computing system can write data into the non-volatile memory.

In accordance with a feature of the invention, a unidirectional signal channel couples the non-volatile memory to the computing system.

BRIEF DESCRIPTION OF THE DRAWINGS

Reference is now made to the drawings wherein like reference numerals designate similar elements in the various figures, and in which.

DESCRIPTION OF THE PREFERRED EMBODIMENTS

Figure 1:
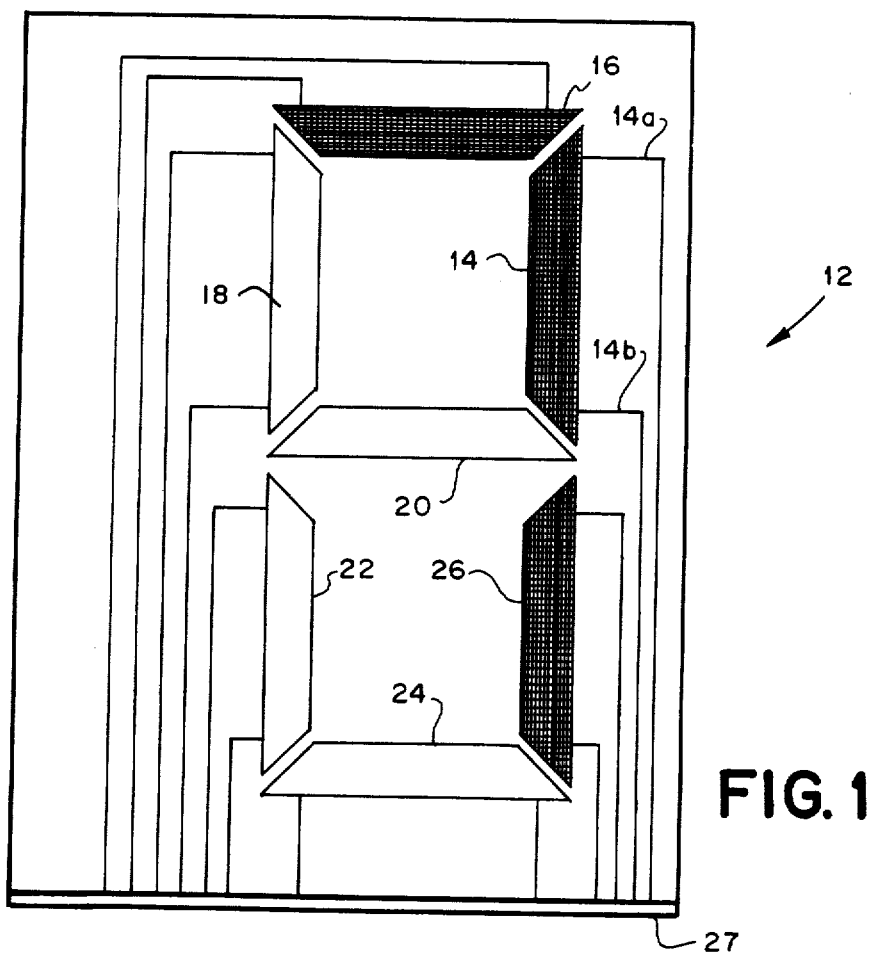
FIG. 1 is a diagramatic view of a seven segment non-volatile memory and display cell suitable for use with the present invention shown in FIGS. 3-7.

Reference is now made to FIG. 1. A memory display 12 includes seven segments 14, 16, 18, 20, 22, 24, and 26. The segments each include two leads connected at either end of the segment. Referencing segment 14, a first lead 14a is connected to the top end of the segment and a second lead 14b is connected to the bottom end of the segment. Each of the remaining segments have similar leads connected thereto. The leads for each segment are brought to an edge connector 27 for further connection to other circuitry, as for example as is shown in FIGS. 4-7. As will be explained in greater detail hereinafter, one of the leads for each segment is employed in connection with writing and erasing the display segment while the other lead, in conjunction with the first lead, is used in reading by mechanical means, such as a computer, to determine whether or not the segment has been made visible.

Figure 2:
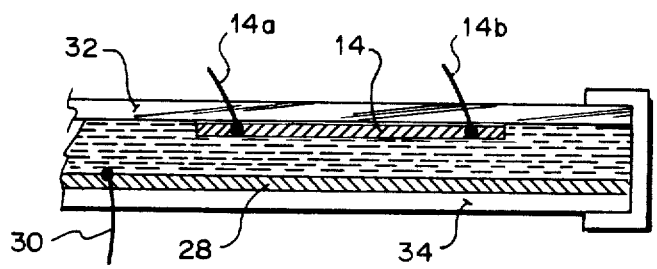
FIG. 2 is a side view of the seven segment non-volatile memory and display shown in FIG. 1.

Reference is now made to FIG. 2 which shows additional structure of the display. A ground plane 28 is spaced apart from the display segment 14, as well as the other display segments 16, 18, 20, 22, 24, and 26. An electrolytic solution such as a metal salt in aqueous or non-aqueous solution is disposed between the segment 14 and the ground plane 28. End caps, only one of which is shown, are provided to retain the solution or paste in the proper position between the segment 14 and ground plane 28. A lead 30 is connected to the ground plane 28 and is brought out to the switch 42. The display segment may be a tin oxide coating, such as a "nesa" coating, deposited on a glass support substrate 32. In a like manner, the ground plane 28 may be a silver coating, deposited on a glass substrate 34. The various leads may also be fabricated from tin oxide or other suitable material and encapsulated in an insulating material such as silicon dioxide to prevent interaction with the electrolytic solution. The structure and operation of the display as associated with the write and erase operation only is disclosed for example in U.S. Pat. No. 4,309,083 for ELECTRODE FOR ELECTROLYTIC CELL PARTICULARLY FOR ELECTROLYTIC DISPLAY CELLS AND PROCESS OF MANUFACTURE and in U.S. Pat. No. 4,306,775 for ELECTROLYTIC DISPLAY CELL AND CONTROL THEREFORE. The system disclosed in U.S. Pat. No. 4,306,775 employs an additional electrode for controlling the writing and erase current associated with plating and deplating the display segment. The disclosures of U.S. Pat. Nos. 4,309,083 and 4,306,755 are hereby incorporated by reference into the disclosure of this application.

Figure 3:
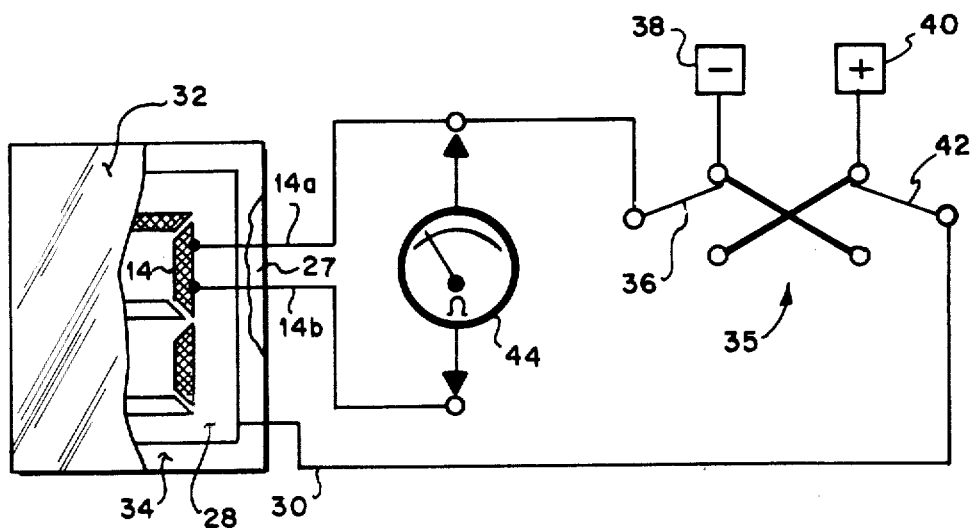
FIG. 3 is a diagramatic view of a system embodying the present invention with a single segment of the non-volatile memory and display shown in FIG. 1 and a system for detecting whether the display element has been made visible.

Reference is now made to FIG. 3 which shows a single display segment. Lead 14a is connected through connector 27 to a switch 35 which is adapted to be switched to connect leads 14a and 30 between a source of positive potential 40 and a source of negative potential 38. With the return lead 30 connected via switch 42 contact to the positive potential, and with switch 36 contact connected to the source of negative potential 38, the metal salt in the electrolytic solution will be plated onto the segment 14 making the segment visible to the naked eye. At the same time, by plating the electrode with highly conductive silver, the electrode is made significantly more conductive, thereby reducing its bulk impedance as measured by ohmmeter 44.

It will be appreciated that the actual change of conductivity is highly related to the area and thickness of the silver coating. The change will be in accordance with the formula set forth below.

In the formula for the resistance of a strip of Nesa (stannic oxide) coated with silver, where L is the length of the segment, W is the width of the segment, $h_{Ag}$ is the thickness or height of the silver, and $H_{Nesa}$ is the thickness or height of the nesa. The bulk resistivity of silver is $P_{Ag} = 1.6 \times 10^{-8}$. The bulk resistivity of Nesa is about $P_{Nesa} \approx 10^{-5} \Omega$. The resistance of the silver is $$R_{Ag} = P_{Ag} \frac{L}{W h_{Ag}}.$$

The resistance of the Nesa is $$R_{Nesa} = P_{Nesa} \frac{L}{W h_{Nesa}}.$$

The parallel resistance is:

$$R = \frac{R_{Ag} R_{Nesa}}{R_{Ag} + R_{Nesa}} = R_{Ag}\left[\frac{1}{1 + R_{Nesa}/R_{Ag}}\right] =$$

$$P_{Ag}\frac{L}{W\, h_{Ag}}\left[\frac{1}{1 + \frac{P_{Ag}}{P_{Nesa}}\frac{h_{Nesa}}{h_{Ag}}}\right]$$

Figure 4:
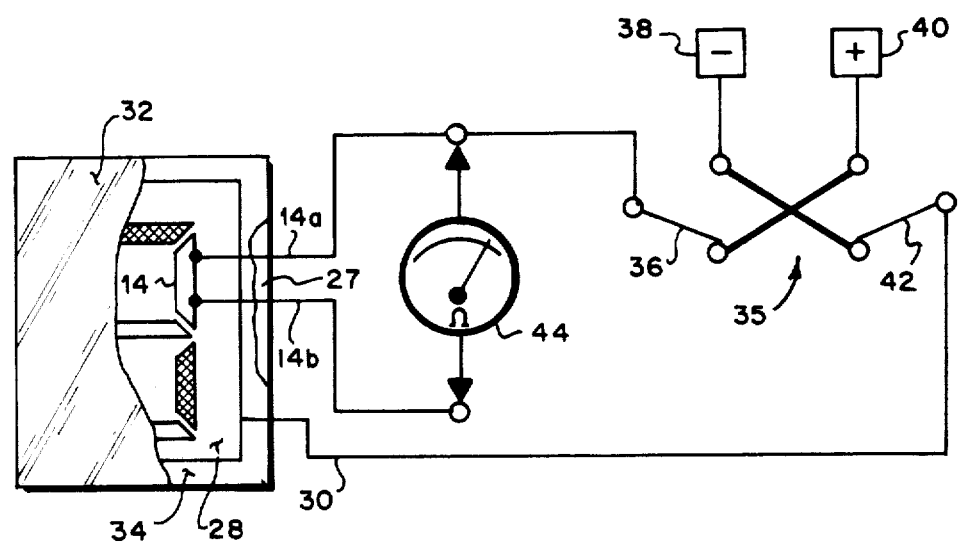
FIG. 4 is a diagramatic view of the system shown in FIG. 3 of a single segment of the display shown in FIG. 1 and a system for detecting whether the display element has been made visible having the ground return switch in an open condition to allow the impedance value of the display element to be determined.

With the return switch 42 connecting the plane lead 30 to negative potential 38 and the switch 36 connected to the source of positive potential 40, any plating on the segment 14 will be removed and returned to the electrolytic solution. This will cause the display segment to be substantially invisible to the naked human eye such as shown in FIG. 4. The cycle of plating and deplating can be repeated at a sufficiently high rate of high speed to be used as both a display and a nonvolatile memory.

Ohmmeter 44 is connected between the segment leads 14a and 14b to provide a device for detecting whether or not the display segment has been made visible to illuminate a particular data value or has been made substantially invisible to represent, in conjunction with other display segments, another human readable data value. In this manner, the display segments are both machine readable and human readable allowing the display non-volatile memory segments to provide the same data in both convenient human readable form and in machine readable form.

When the display segment impedance is measured by ohmmeter 44, should it be desired switches can be provided and opened to prevent additional plating or deplating of the display segment due to the ohmmeter current. However, in the normal situation the current will be so small as to be inconsequential in this regard, especially as the ohmmeter is not connected by any lead to plane 28 and is only connected to the segment. Opening such a switch breaks the circuit path between the display segment and the plane 28 thereby avoiding further electrolytic action. The significant current flow is through the display segment 14 and the display segment leads 14a and 14b and not the electrolytic solution. The operation of any switch decoupling plane 28 from the source of positive and negative potential 40 and 38, respectively, can be an electronic switch, such as a transistor type switch, and can be ganged for synchronous operation with the operation of ohmmeter 44.

Figure 5:
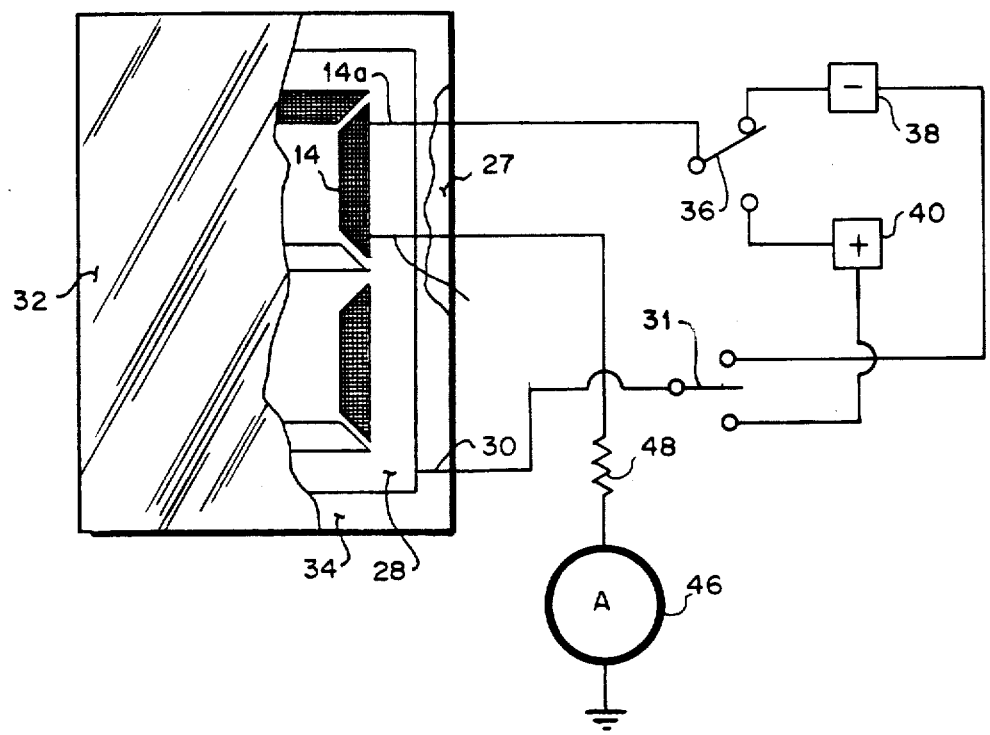
FIG. 5 is a diagramatic view of another system embodying the present invention with a single segment of the seven segment display of FIG. 1 employing an alternate system for detecting whether the display element has been made visible.

An alternate method of detecting the visible condition of the display segments is shown in FIG. 5. The presence or absence of a plating on segment 14 is determined by ammeter 46 which is connected in series with current limiting resistor 48 between segment lead 14b and ground. With the switch 36 connected to either the negative source of potential 38 or the positive source of potential 40, a current is caused to flow through the segment and through the ammeter. This provides a machine readable indication of whether or not the display segment is in human visual readable form or is substantially invisible. In the embodiment, plane 28 is also selectively connected via lead 30 and switch 31 to the source of negative potential 38 and positive potential 40. The switches 36 and 31 are ganged for operation and operate in conjunction with operation of ammeter 46 to insure proper current flow during plating, deplating and ammeter operation. Moreover, the ammeter reading can be achieved in a pulse mode resulting in an extremely low current of short duration. current limiting resistor 48 limits the current to a level which is insufficient to cause the segment to be further plated or to be deplated. It should be noted that switch 31 can be coupled to operate in conjunction with the reading of the condition of the segment 14 to further avoid any possible problem of plating or deplating.

It should be recognized that other segment machine readable techniques are suitable for use with the systems described above, as for example, by utilizing voltmeters.

Figure 6:
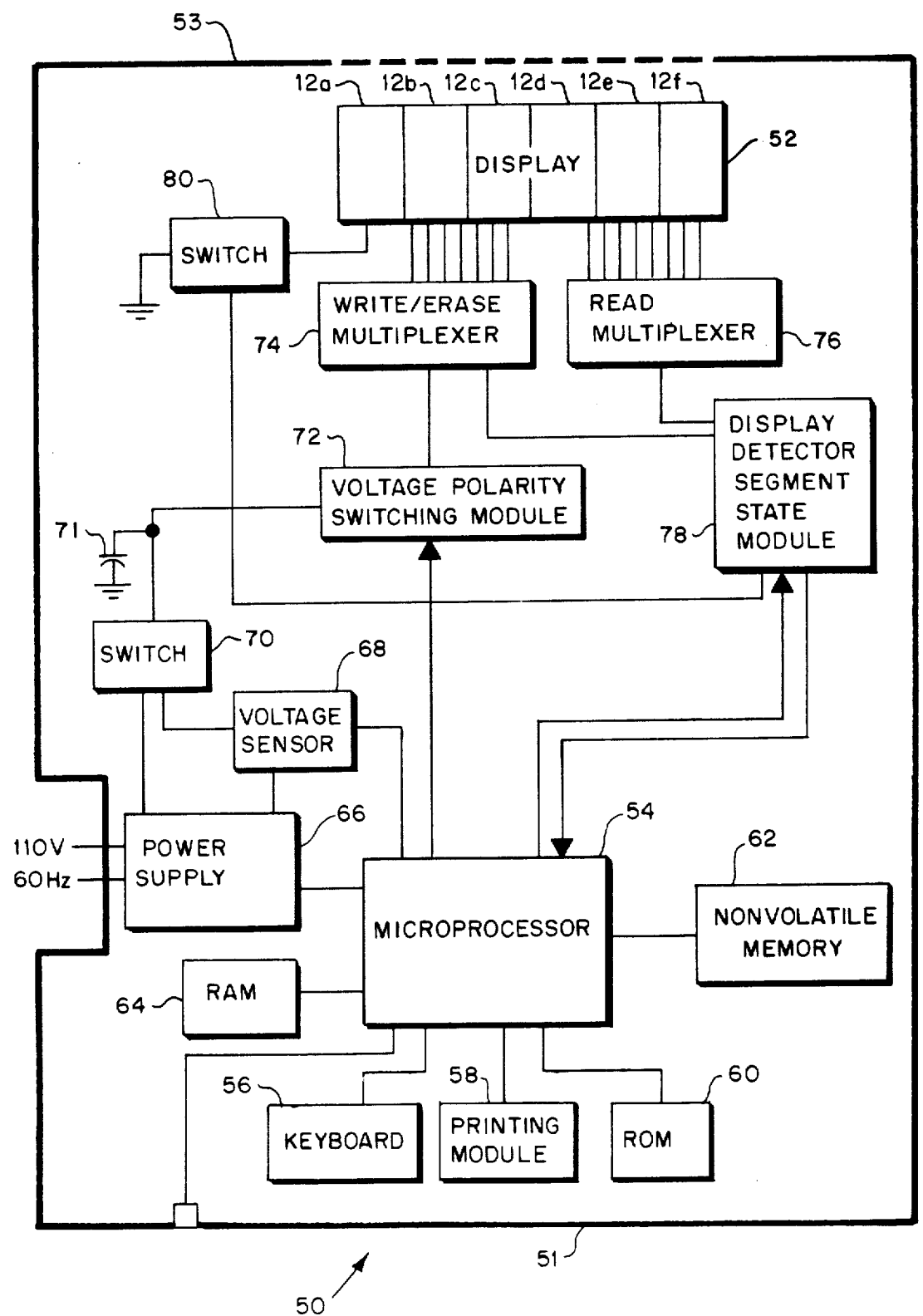
FIG. 6 is an electronic postage meter system embodying the present invention and employing a plurality of display elements shown in FIG. 1 as both the non-volatile memory and a display for the system.

Reference is now made to FIG. 6. An electronic postage meter 50 includes a memory display 52 which will be described in greater detail hereinafter consisting of a plurality of display/non-volatile memory seven segment cells 12a, 12b, 12c, 12d, 12e, and 12f. The number of display non-volatile memory cells is not central to the invention and depends upon the nature of digits or data to be displayed. The electronic postage meter 50 includes a tamper resistant housing 51 with a display aperture area 53. The display aperture area may comprise a screen type structure to provide additional shielding for the display non-volatile memory cells to avoid the effects of electromagnetic radiation.

The electronic postage meter 50 includes a microprocessor 54 operatively connected to an electronic postage meter keyboard 56, a meter postage printing module 58, and a read-only memory (ROM) 60. The read-only memory 60 contains the operating program of the postage meter which may be similar to the operating programs shown in conjunction with the above noted electronic postage meter patents. A non-volatile memory 62 and a random access memory 64 may also be connected to the microprocessor. The non-volatile memory 62 provides a redundant memory for the system to the display memory 52 and is an optional element in the system. The random access memory 64 provides a memory for temporarily storing information during the operation of the microprocessor 54. It should be noted that the non-volatile memories 52 and 62 provide a means for data storage when power is removed from the meter, particularly for critical accounting data such as the current ascending register value and the current descending register value of the meter. Additional data may be stored in the nonvolatile memories such as codes associated with service experience for the meter.

A power supply 66 is energized by an external source of operating potential such as a 110 volt, 60 hertz supply. The power supply is coupled to the microprocessor 54 and, other components requiring energization. A voltage sensor 68 is coupled to both the power supply and microprocessor. When a power failure is detected, the voltage sensor 68 provides a signal to the microprocessor. This causes the microprocessor to initiate a power down routine which is part of the operating program stored in the read-only memory 60. The voltage sensor is also coupled through a switch 70 to a voltage polarity switching module 72 which will be described in greater detail hereinafter. Switch 70 operates to decouple the display memory from the power supply during power failure conditions such that the display memory is energized by a storage capacitor 71 for a sufficient period of time to complete the writing of information to the display memories 52 and 62 which are in progress and to write any critical information from the random access memory into the non-volatile memories. Capacitor 71 provides power to the microprocessor and other vital portions of the meter necessary to complete any critical operations in progress.

The segment leads of each of the cells 12a, 12b, 12c, 12d, 12e, and 12f are connected to a write/erase multiplexer 74 and the "b" leads from each of the display cell segments are connected to a read multiplexer 76. Although for a seven segment display cell arrangement forty-two leads would be connected to each multiplexer, seven for each display cell, only eight are shown for the sake of simplicity. Alternative multiplexing techniques can be employed where the ground plane leads of the various cells are multiplexed so that all the "a" leads and "b" leads of each of the various segments can be connected together to reduce the number of leads to be multiplexed. A display detector segment state module is provided which is operatively connected with microprocessor 54. The display detector segment state module is connected to the multiplexers 74 and 76 and additionally coupled to a display cell ground return switch 80. In this mode of operation, the display detector segment state module functions similar to the ohmmeter system described in FIGS. 3 and 4 to detect the condition of the various segments, that is, to determine whether the various display non-volatile memory segments are human readable or substantially invisible. This allows the same human readable data to be detected and coupled in digital data formats to the microprocessor for processing.

Figure 7:
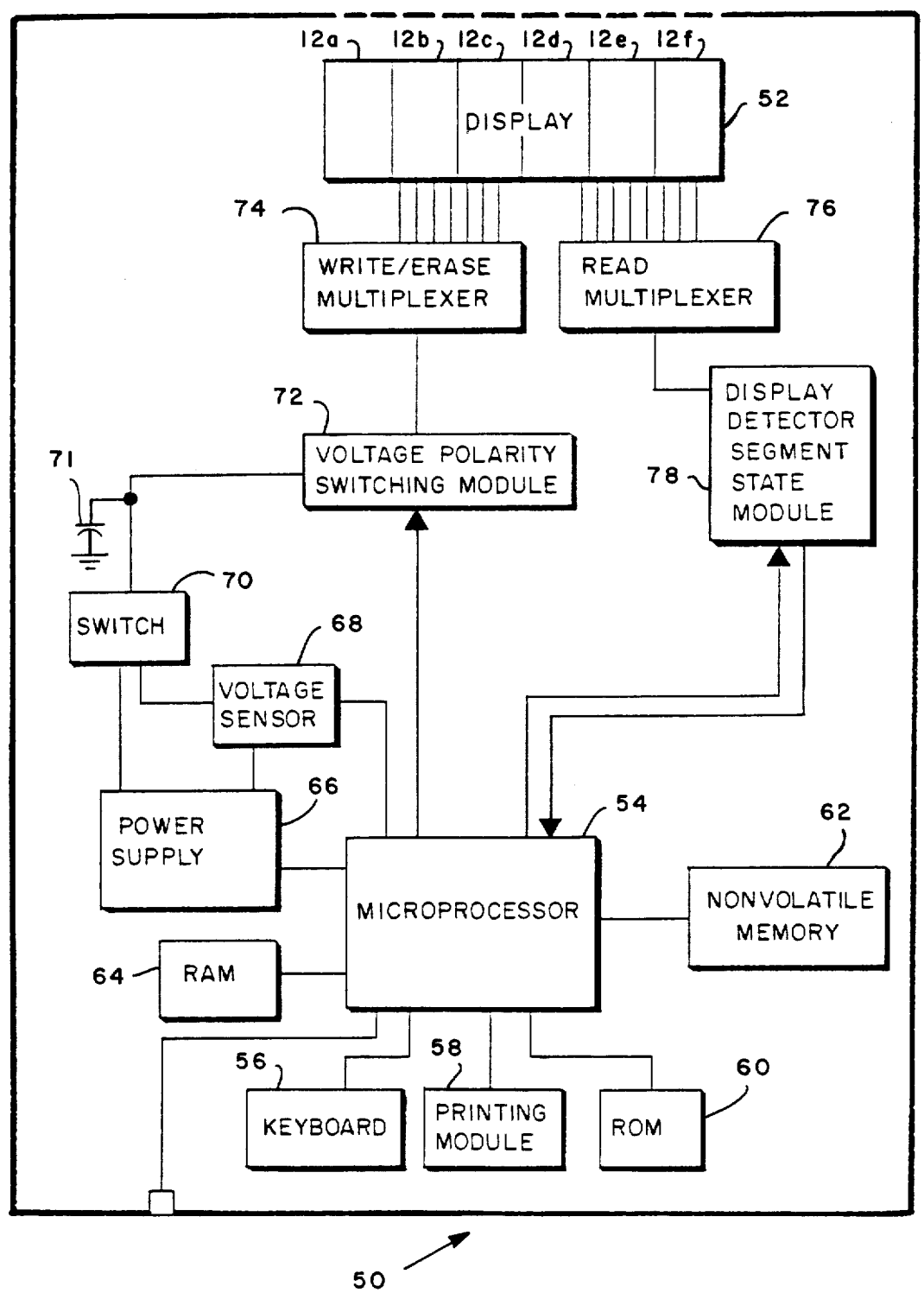
FIG. 7 is an alternate embodiment of the electronic postage meter system shown in FIG. 6 embodying the present invention and employing a different method for determining the value of the display elements.

Reference is now made to FIG. 7. The microprocessor 54 operates the voltage polarity switching module 72, in conjunction with the write/erase multiplexer 74, to place a predetermined voltage of a predetermined duration on selected display non-volatile memory segments. This causes the display segment to be plated and rendered visual, for example constituting a 1 or to cause the display segment to become depleted and substantially human invisible to constitute, for example a 0. In this way, both human visual readable and machine readable binary information is simultaneously stored in each display non-volatile memory display cell segment. The multiplexers serve to selectively connect the voltage polarity switching module 72 as well as the display detector segment state module 78 with selected display non-volatile memory segments of each of the display non-volatile memory cells 12a through 12f. The voltage level and duration are a matter of design choice based on the size of the segment, type of electrolytic solution employed and density differential desired between plated and deplated display cell segments.

Reference is now made to FIG. 7. The system in FIGURE 7 incorporates in the display detector segment state module a current limiting measuring technique similar to that shown in FIG. 5. Accordingly, the ground return switch 80 is no longer employed. However, as mentioned in connection with FIG. 5, should it be desired, the ground return plane can be coupled through a switch operativelyconnected to the display detector segment state module to synchronously connect and disconnect the ground plane from its ground path return at the appropriate time to enable both plating and deplating and also to enable the machine reading of the segment condition.

Figure 8:
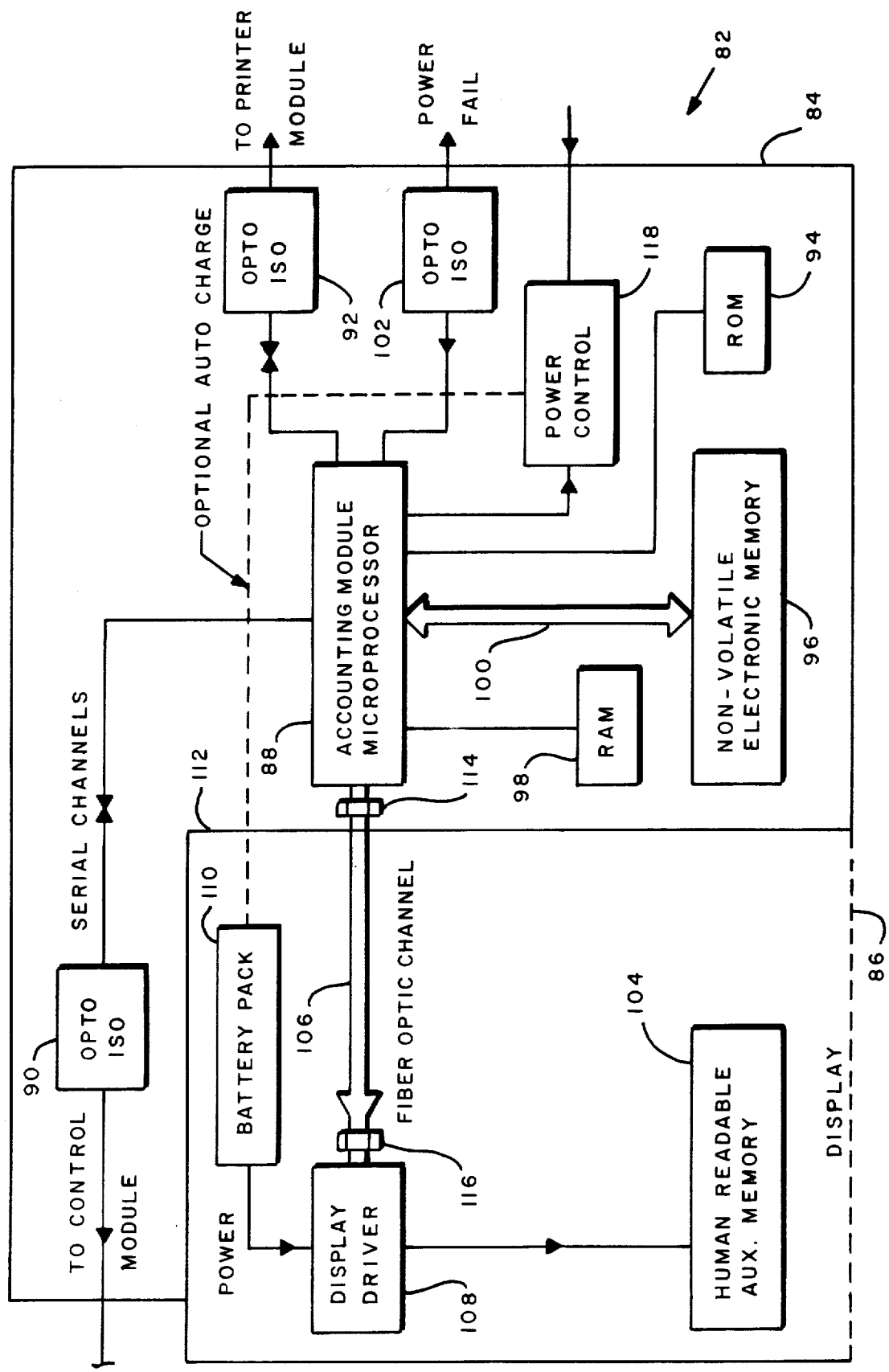
FIG. 8 is an electronic postage meter system embodying the present invention where the human visually readable display is isolated from the meter accounting circuits.

Reference is now made to FIG. 8. An electronic postage meter system accounting module 82 is suitable for use in systems such as shown in U.S. Pat. No. 4,301,507 for ELECTRONIC POSTAGE METER HAVING PLURAL COMPUTING SYSTEMS. Electronic postage meter systems of that type may include a separate module for controlling the electronic accounting functions, a separate module for controlling the printing functions and a separate module for controlling the keyboard and display functions, each with a separate microprocessor. The accounting unit includes a tamper resistant housing 84 with a display aperture area 86. The display aperture area may, as note above, comprise a screen type structure to provide additional shielding for the display non-volatile memory to avoid the effects of radiation.

The electronic postage meter accounting module 82 includes a microprocessor 88 for controlling the meter accounting functions. The microprocessor 88 is operatively connected to an electronic postage meter control module via an opto-isolator 90. The control module, if such a unit is provided, may control a keyboard and display, or may constitute a mailing machine or scale operatively connected to the electronic postage meter accounting module 82. The accounting microprocessor 88 is also connected via an opto-isolator 92 to a printer for printing postage or may cooperate with another computer, such as a personal computer. A read only memory (ROM) 94 is connected to the microprocessor 88 and contains the operating program for the accounting module 82. The program may be similar to the operating programs disclosed in the above noted electronic postage meter patents. A non-volatile memory 96 and a random access memory 98 may also be connected to the microprocessor 88. The non-volatile memory 96 may be a battery backed up CMOS type non-volatile memory, and MNOS type non-volatile memory, a floating gate type non-volatile memory or other suitable device. The non-volatile memory 96 in connected via a bus 100 to the accounting microprocessor.

A power failure detection circuit external to the accounting module housing 84 is connected via an opto-isolator 102 to the accounting module microcomputer 88. Information passed via the opto-isolator 102 allows the microcomputer 88 to be caused to enter a power down routine when an external power failure is detected. The random access memory 98 provides a memory for temporarily storing information during operation of the microprocessor. The non-volatile memory 96, along with a human readable auxiliary non-volatile memory 104 provide means for storing data when power is removed from the electronic accounting module 82, particularly for critical accounting data such as the current ascending register value and the current descending register value of the meter. Additional data again, as noted above may be stored in the non-volatile memories such as codes associated with service experience for the meter. The power down routine is similar to that described above in connection with FIGS. 6 and 7. It should be recognized that human readable auxiliary non-volatile memory 104 facilitates the construction of the meter without a full user display as the use of the memory display 104 allows the meter to be taken to the Postal Service for funds recharging, inspection or the like. It should also be recognized that the memory 104 can always be powered on for display, not only during downtime depending on the particular application.

Specifically when a power failure is detected, the voltage sensor provides a signal via opto-isolator 102 to the micro-processor 88. This causes the microprocessor to initiate a power down routine which is part of the operating program stored in the read only memory 94. A storage capacitor not shown, provides power for a sufficient period of time to complete the writing of information to the non-volatile memory 96, and as will be explained in greated detail hereafter, to the human visually readable non-volatile memory 104 which are in progress and to write any critical information from the random access memory 98 into the non-volatile memories. The capacitor as noted above provides power to the microprocessor and other vital portions of the meter necessary to complete any critical operations in progress. For example, if the non-volatile electronic memory is a battery backed up CMOS type non-volatile memory, such as is shown in European Patent Application Publication No. 0 019 515 for ELECTRONIC POSTAGE METER HAVING IMPROVED SECURITY AND FAULT TOLERANCE FEATURES, the circuits to cause the CMOS battery to be operatively coupled to the non-volatile memory would be activated.

The accounting microprocessor 88 is connected via a fiber optic channel 106 to a display driver 108. The display driver is connected to drive the human visually readable auxiliary memory 104. This memory, for example may be a liquid crystal display which requires power provided by a battery pack 110. Alternatively, the human visually readable memory 104 may be the plating type display described above in which case, the battery pack 110 would not be required. The battery pack display driver 108 and human visually readable display 104 are housed within a shielded subcompartment 112 within the housing 84 of the accounting module 82. The human visually readable non-volatile memory display 104 is positioned adjacent the aperture 86 to enable reading of the display.

It should be recognized that the fiber optic channel is provided with electrical to optical converter 114 at the microprocessor 88 side of the fiber optic channel 106 and a optical to electrical converter 116 at the display driver 108 side of the fiber optic channel 106. Thus, the fiber optic channel is unidirectional and the human visually readable non-volatile memory display 86 is fully isolated from the accounting unit circuitry. The fiber optic channel may, for example, be a type HFBR, Hewlett Packard, fiber optic link with Model 1502 transmitter and Model 2502 receiver. If desired, while providing suitable protection to isolate the circuitry, the accounting microcomputer 88 can be connected to a power control circuit 118. Circuit 118 may provide power to the display driver 108 via the battery power pack when normal power conditions obtain in the meter and additionally function to charge the batteries of the battery power pack 110.

Figure 9:
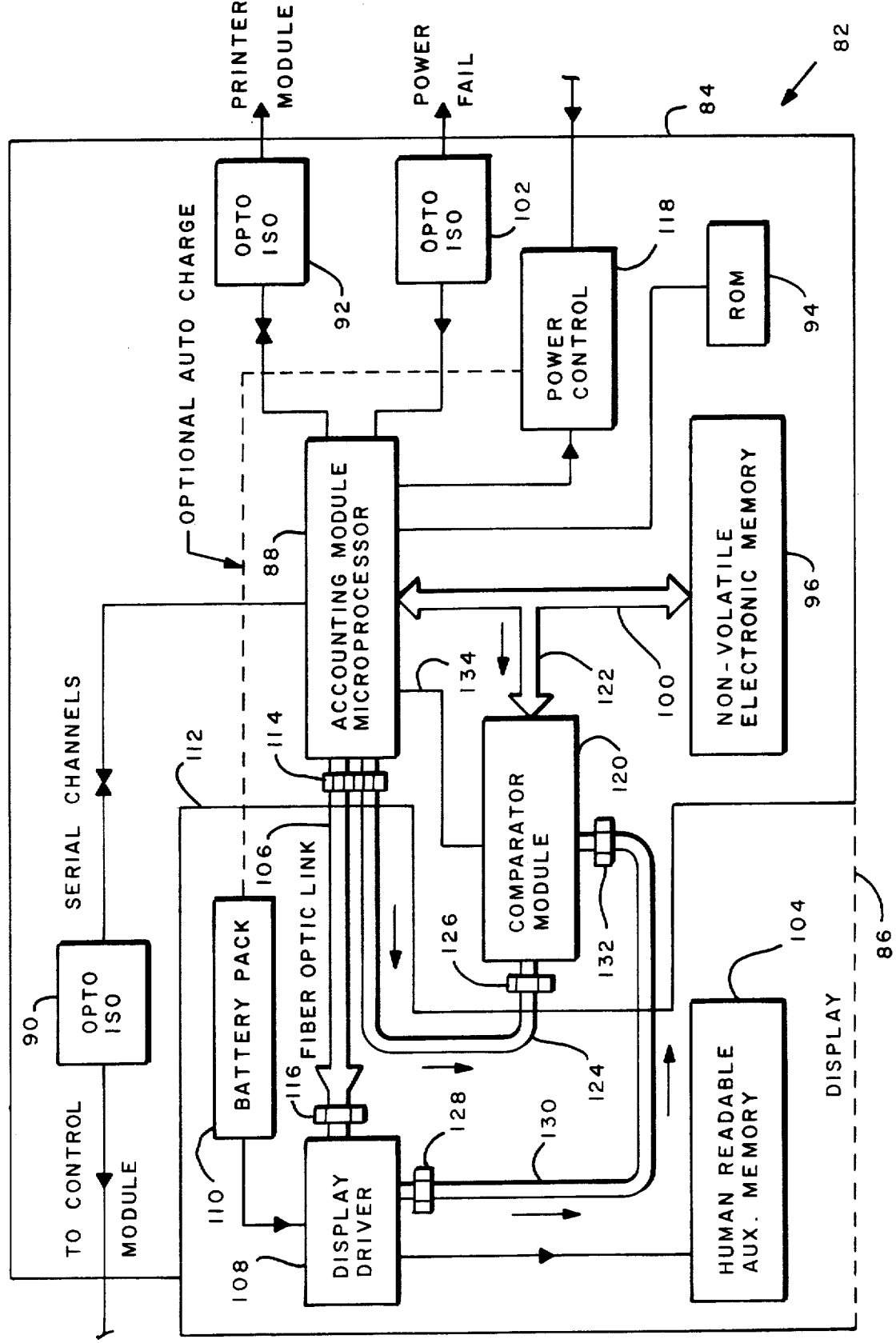
FIG. 9 is an electronic postage meter system as shown in FIG. 8 also including a system to insure corresponding data is written into both the human visually readable non-volatile and another non-vatie memory associated with the meter accounting circuits.

Reference is now made to FIG. 9. The system shown in FIG. 9 is similar to that of the system of FIG. 8 with the addition of a comparator module 120 and associated circuitry. THe comparator module functions to provide assurance that the data being entered into the non-volatile memory 96 and the data entered into the human visually readable non-volatile display 104 correspond. The comparator module can be incorporated either within the auxiliary housing 112 or within the section of the microprocessor 88 section of the housing 84 depending upon the configuration and level of isolation desired. The data applied by the microprocessor over bus 100 to non-volatile memory 96 is also applied via bus 122 to comparator 120. Additionally, the data applied to the display driver from the electrical to optical converter 114 is applied to a second fiber optic channel 124 and an optical to electrical converter 126 to comparator module 120. A third input is also applied from the display driver via an electrical to optical converter 128 a fiber optic link 130 and an optical to electrical converter 132. A feedback connection 134 is provided between the comparator module 120 and the accounting microprocessor 88. In this manner, if disagreement exists among the data being applied to the two non-volatile memories, error correction techniques can be applied to assure correspondence of the data. For example, a recalculation routine can be executed by the microcomputer 88 or the auxiliary human visually readable non-violatile memory 104 can be disabled.

It should be recognized that it is a matter of design choice whether to utilize the two unidirectional fiber optic links 124 and 130 or only one such link, as for example eliminating link 124 and its associated circuitry, depending upon the level of assurance desired that corresponding data is being provided to both memory systems. It should also be recognized that the microprocessor 88, under program control, can either disable the human visually readable non-volatile memory display 104 or the non-volatile memory 96 or alternatively to attempt another write cycle in the same memory locations of the same data to determine if a correspondence can be obtained.

With the systems shown in FIGS. 8 and 9 the human visually readable non-volatile memory display 104 is written every cycle while the non-volatile memory 96 may be either written only during power down sequences or, alternatively as is the case with the system shown in European Patent Application Publication No. 0 019 515, for ELECTRONIC POSTAGE METER HAVING IMPROVED SECURITY AND FAULT TOLERANCE FEATURES, during every postage meter system transaction.

It should be understood that implementation of other variations and modifications of the invention in its various aspects will be apparent to those skilled in the art, and that the invention is not limited by the specific embodiment described. For example, other nonvolatile display devices which involve a significant change in a measurable physical property of the display segments are suitable for use in the present invention and are intended to be covered by the claims. One such display device example is the EPID type display such is shown in U.S. Pat. No. 4,218,302 for ELECTROPHORETIC DISPLAY DEVICES. Moreover, the electrolytic solution which may contain one of the group of silver, iodide, bromide and chloride and also containing a salt of one of the group of ammonium and halide for the displays disclosed in this application, may be composed of other suitable solutions allowing plating and deplating. It is therefore contemplated to cover by the present patent any and all modifications, variations or equivalents of the invention that fall within the true spirit and scope of the basic underlying principles disclosed and claimed herein.

What is claimed is:

1. A system including computing means for performing data computations, the improvement comprising:
a non-volatile memory means including locations for storing data values, said locations being physically accessible such that said locations can be human visually readable to determine said data values stored therein, optical coupling means coupling said non-volatile memory means and said computing means such that said computing means can write data into said non-volatile memory means, said human visually readable non-volatile memory means comprising an electrolytic display of data cell of the type having two plates whereof one is covered by a semi-transparent electrode, an electrolytic solution containing platable marking particles disposed between said plates, the display being obtained by connecting the electrode to a source of potential of a first polarity and the erasing of data by connecting the electrode to a source of potential of a second polarity, said electrode having a first terminal and a second terminal, said first and said second terminals being connected to means for detecting whether a display has been obtained on said electrode.

2. A system as defined in claim 1 wherein said human visually readable non-volatile memory means is adapted to display alpha-numeric type human visually readable type data.

3. A system as defined in claim 2 wherein said optical coupling means is a unidirectional optical transmitting link such that optical information can be sent only from one end of the link and received at another end of the link.

4. A system as defined in claim 3 wherein said system includes a second non-volatile memory means coupled to said computing means and comparator means coupled between said electronic display cell and said second non-volatile memory means for comparing the correspondence between the data written by said computer means into said two non-volatile memories means.

5. A system as defined in claim 4 wherein said comparator means is coupled to said computing means means to signal said computing means means when a non-correspondence is determined between the data written into said two non-volatile memory means.

6. A system as defined in claim 4 wherein said comparator means is coupled to said computing means means to signal said computing means means when a correspondence is determined between the data written into said two non-volatile memory means.

* * * * *